Patented Nov. 16, 1926.

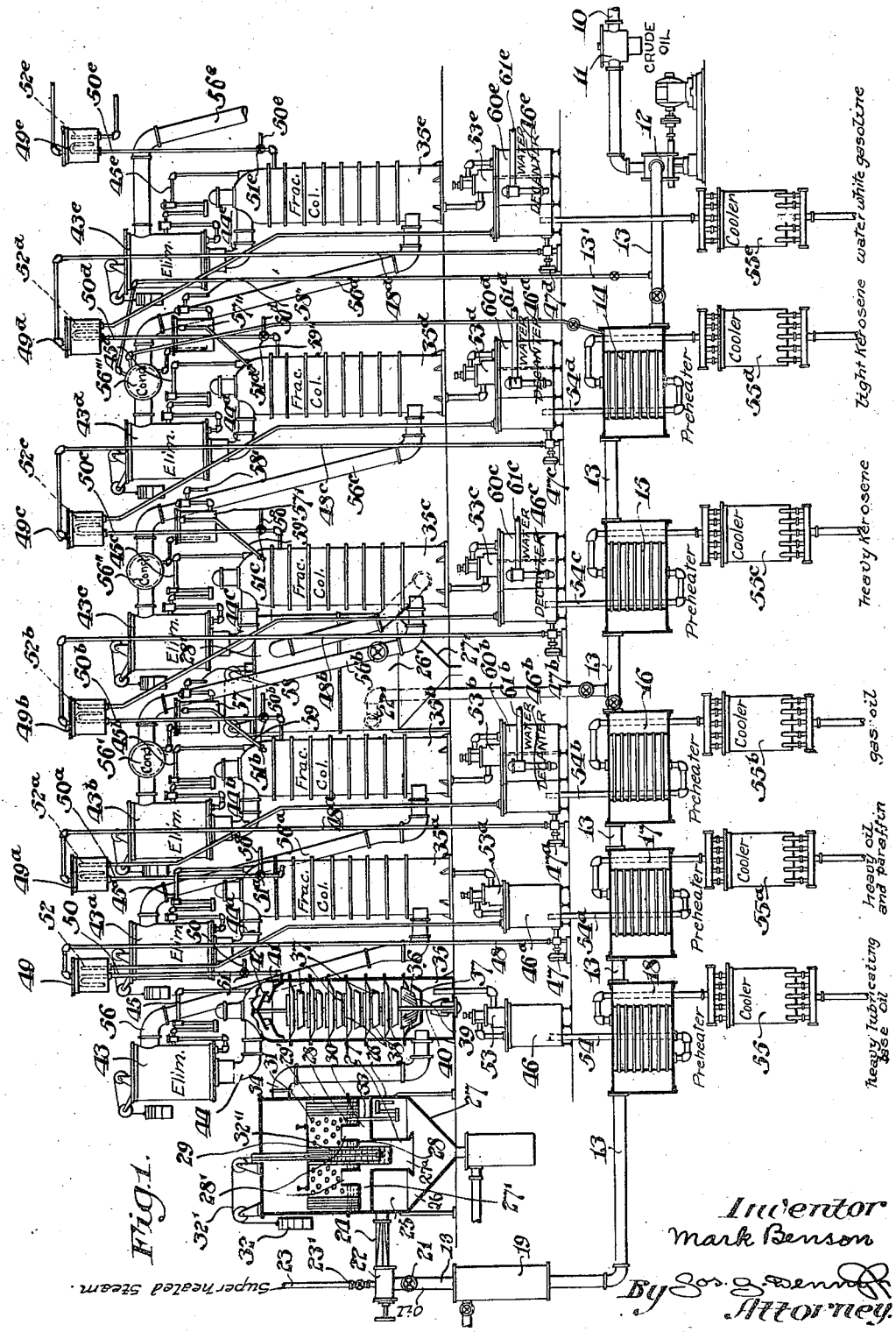

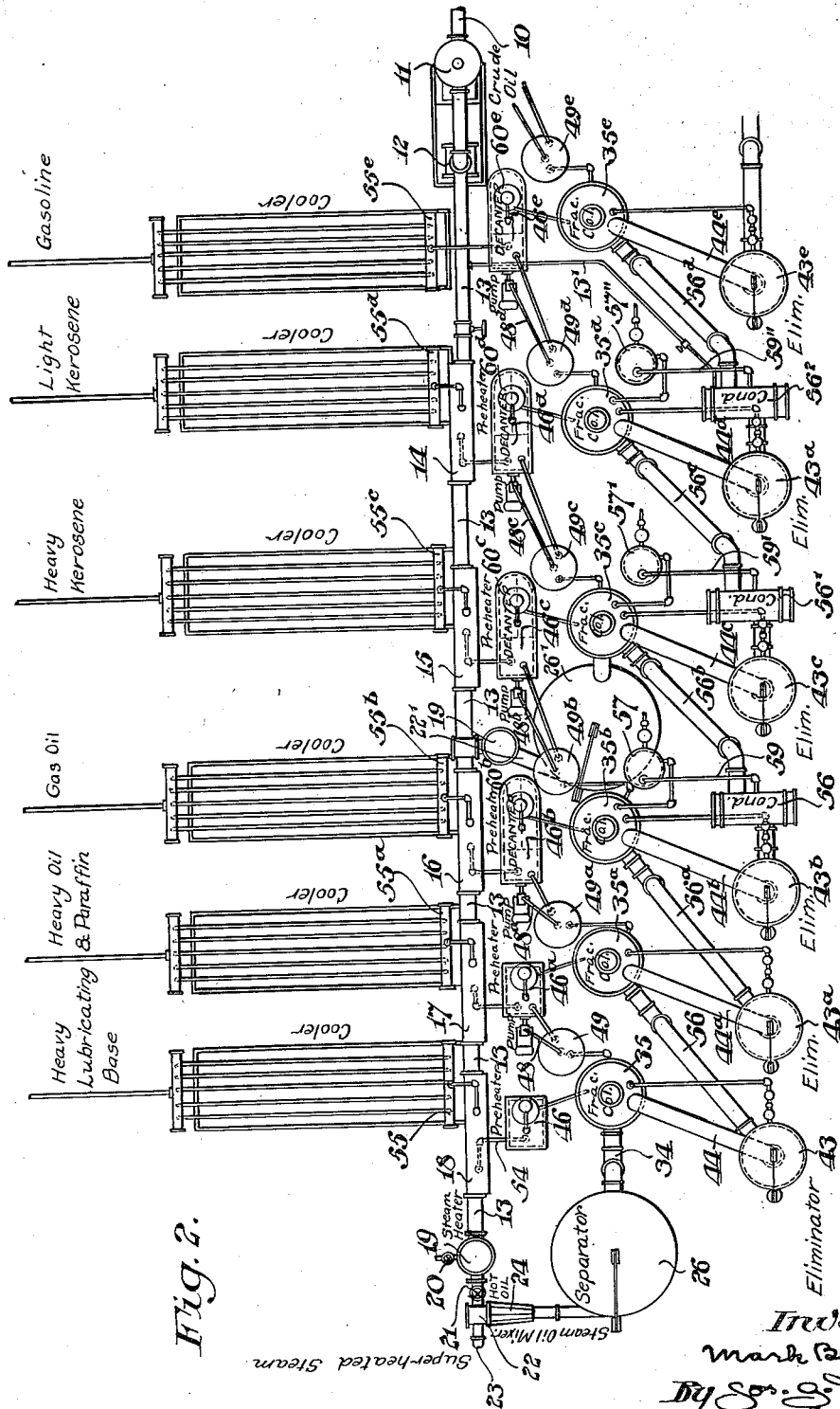

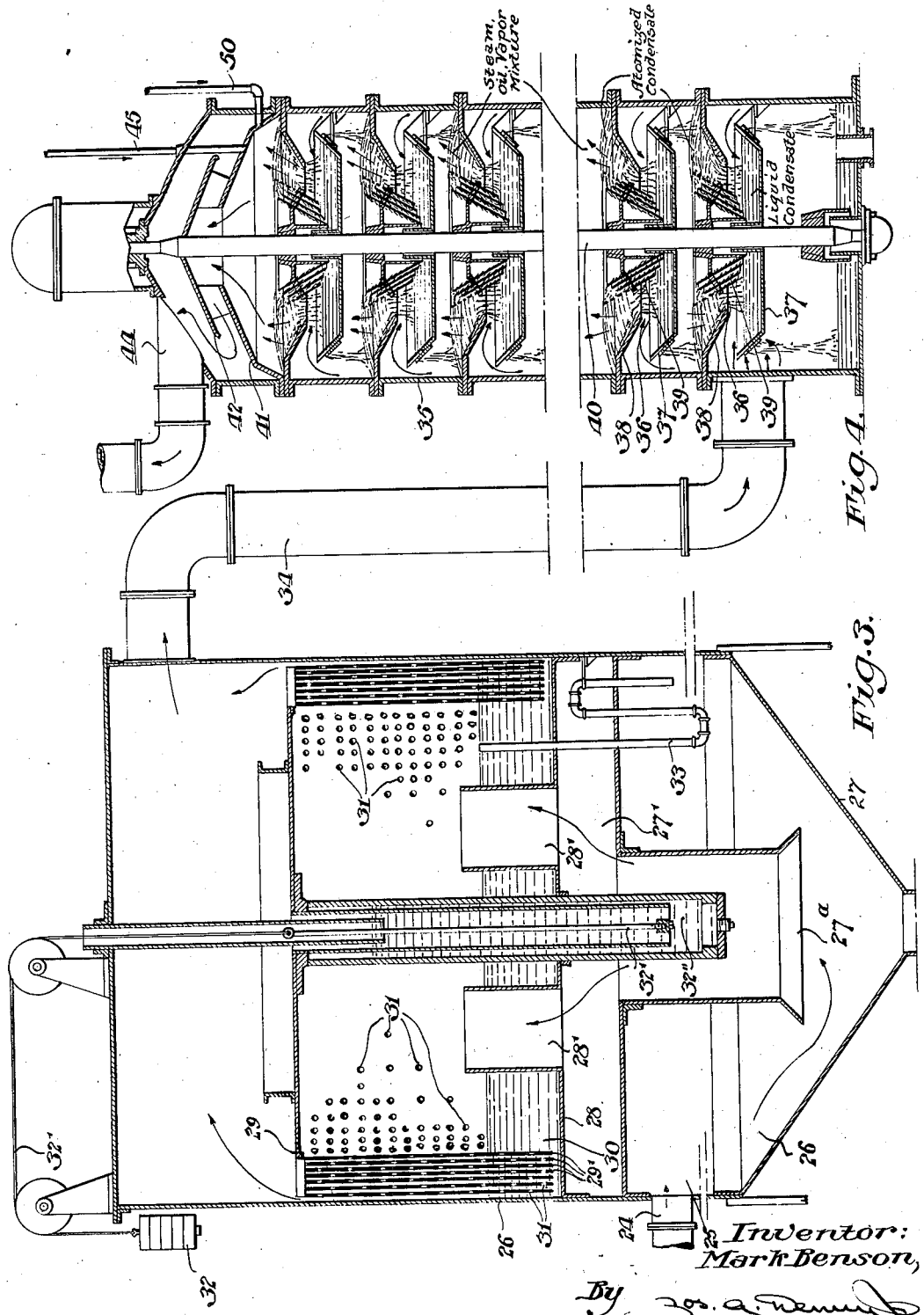

1,607,043

UNITED STATES PATENT OFFICE.

MARK BENSON, OF LONDON, ENGLAND, ASSIGNOR TO THE CANADIAN AMERICAN FINANCE & TRADING COMPANY, LIMITED, OF VICTORIA, BRITISH COLUMBIA, CANADA, A CORPORATION OF BRITISH COLUMBIA.

METHOD OF AND APPARATUS FOR DESULPHURIZING AND FRACTIONALLY SEPARATING PETROLEUM.

Application filed April 7, 1924. Serial No. 704,770.

This invention is a process and apparatus for desulphurizing and for separating into desired fractions the hydrocarbon constituents of petroleum oils by composite vaporization of such constituents and the separate condensation and precipitation from the composite vapors of "cuts" having desired characteristics without precipitation of difficultly removable sulphur compounds, and preferably without precipitation of the bulk of the sulphur.

This invention contemplates the formation of vapor of composite character, containing both desired and undesired constituents, by intimate admixture with a liquid hydrocarbon (preferably under pressure) of superheated steam under pressure, and the immediate release of the pressure, with resulting expansion and substantially instantaneous vaporization of all or any desired part of the volatile constituents in undecomposed form and the dispersion thereof in a relatively large volume of superheated steam to form a composite steam-oil vapor mixture, from which non-volatilized matter is segregated by the sudden expansion. The admixture of the steam and oil may be advantageously effected by flowing the superheated steam against a solid or comminuted jet or spray of oil flowing counter-current thereto and under substantially the same pressure as the steam. The dehydrogenating and cracking effect of vaporization by indirect heat transfer through catalytic surfaces of higher temperature than initial temperature of the vapor mixture is avoided.

The composite steam-oil vapor mixture, after detrainment of contaminating and sulphur impregnated detritus, is subjected to a series of precipitations in stages by cooling in intimate contact with mechanically atomized condensate deposited therefrom under conditions to which the vapor mixture is at the time subjected, and in intimate contact with mechanically atomized condensate of lower dewpoint than the temperature of the vapor mixture being treated. Such treatment varies the surface tension of the liquid mixture, effects enrichment or saturation of the vapor mixture by being treated with hydrocarbon constituents of lower dewpoint, and effects precipitation of the hydrocarbon constituents of higher dewpoint without causing the formation of difficultly removable sulphur compounds, or the precipitation of relatively large amounts of sulphurous vapors. The condensate of lower dewpoint is preferably purified by decantation before recirculation to the preceding fractionating column.

This invention also contemplates the extraction from the steam-oil vapor mixture of water vapors between several stages of hydrocarbon precipitation in contact with hydrocarbon condensates. Such extraction, by limiting the volume of the expanding vapor mixture, checks the velocity of flow thereof, with consequent diminution of entrainment; effects the reduction of the excessive steam ratio resulting from the progressive extraction from the steam-oil vapor mixture of hydrocarbon constituents; avoids excessive dilution of the final hydrocarbon condensate; permits mechanical atomization of condensate in the fractionating columns without the expenditure of excessive power; permits the practice of my process in apparatus of practicable size and proportions, and increases the capacity of a plant of given size. By my process, the steam-oil vapor mixture may have precipitated therefrom a condensate composed primarily of hydrocarbons with but a slight amount of water, may thereafter have precipitated therefrom a condensate composed of a large volume of water with but a slight amount of hydrocarbons, and thereafter have precipitated therefrom a further condensate comprised of a large volume of hydrocarbons with but a slight amount of water.

By the hydrolysis due to the intimate and repeated contact or mixture of the hydrocarbon with the steam content of the vapor mixture and the comparatively large volume of steam content of the mixture relatively to the hydrocarbon constituents, the sulphur compounds initially present in the petroleum are caused to form partially hydrolyzed compounds, such as mercaptans, readily removable by washing with water or small amounts of known reagents. If the initial temperature and volume of steam are sufficient, there is formed hydrogen sulphide, which largely passes off with non-condensible gases and wash water and/or may be condensed and removed from the condensate by small quantities of known-reagents; such reaction apparently resulting from a reversible process which may be represented by the formula

and the ratio employed being such as to drive the equilibrium point of the reaction in the direction of substantially increased hydrolysis. Hydrolysis may, if desired, be facilitated by exposure of the composite steam-oil vapor mixture to small amounts of catalysts (such as oxide of iron, bauxite or other alumina) without the deleterious effects resulting from vaporization of the oil through or in the presence of catalysts.

The fractional precipitation of the hydrocarbon vapors in intimate contact with mechanically atomized condensate produced under conditions to which the vapors are then subjected, and in intimate contact with mechanically atomized recirculated condensate of lower dewpoint, effects such rectification of the fractionation due to condensation that, by a single continuous straight run operation, there are secured marketable products of such definite and desired characteristics as to fit them for immediate use; it being practicable to secure a water white gasoline of low sulphur content (say .04%) by a single distillation from a Persian crude having an initial sulphur content of 1%, which, when distilled and redistilled in the usual manner with the aid of steam, yielded gasoline of .18% sulphur content.

The residual sulphur in such gasoline produced by my method was reduced to .01% by treatment with ½% of fuming oil of vitriol, neutralization with light alkali and water washing, and to .015% by treatment with a small quantity of sodium hypochlorite, neutralization with light alkali and water washing; whereas the gasoline produced in the usual manner was substantially unaffected by treatment with such a small quantity of fuming oil of vitriol, neutralization and washing, and required several treatments with large quantities of sodium hypochlorite, soda and water to effect the same amount of sulphur removal. A gas and lubricating oil fraction of gravity .792 produced by my method from Persian crude oil contained only .4% sulphur, while a gas and lubricating oil fraction of gravity .792 produced from such Persian crude by distillation in the usual manner with the aid of steam contained 1.2% sulphur in the form of difficultly removable organic sulphur compounds. In another instance, the same amount of sulphur was removed from distillate produced by my method by washing once with normal hypochlorite, followed by neutralization and water washing, as was removed from oil produced from the same crude by usual methods by twice washing with tri-normal hypochlorite and soda and once washing with 2% of fuming oil of vitriol, each treatment being followed by neutralization and water washing.

The intimate contact between the steam-oil vapor mixture and condensates of different dewpoints, to augment and accelerate the coaction thereof, is primarily effected by minutely subdividing and effecting rapid movement by mechanical means of the particles of condensates so that they are virtually held in suspension, somewhat like a mist or fog, and present the maximum area or reacting surfaces between the vapor mixture and condensates. The repeated minute dispersion of the condensates promotes the absorption by the vapors from the recirculated condensates of constituents of low dewpoint and the deposition from the vapors of constituents of high dewpoint; is believed to facilitate by repeated contact with steam the hydrolysis of the initial sulphur compounds present in the oil and production of mercaptans and hydrogen sulphides; and permits the treatment of large volumes of material relatively to the size of the fractionating columns. The recirculation and mechanical atomization of the condensate of lower dewpoint in the path of the steam-oil vapor mixture permits accurate control of the breadth of cut and causes such differences in the surface tensions of the hydrocarbon and water constituents of the vapor mixture as to permit water vapor precipitation without substantial or deleterious hydrocarbon precipitation between the stages of hydrocarbon precipitation in contact with atomized condensates.

The accompanying drawings illustrate the layout of a plant for the practice of our process for the production of commercial petroleum fractions in a single distilling operation.

In the drawings, Fig. 1 is a diagrammatic side elevation, partly in section, of a plant designed for the practice of my process; and Fig. 2 is a diagrammatic plan view of the same, parts being omitted for the sake of better illustration; Fig. 3 is an enlarged vertical sectional view of the separator shown in Figs. 1 and 2; and Fig. 4 is an enlarged vertical sectional view of a fractionating column.

In the operation of the plant illustrated in the drawings, petroleum delivered by a conduit 10 passes through a suitable filter 11 to a pump 12, by which it is forced under pressure through the conduit sections 13 and the tubes of the economizing heat exchangers 14, 15, 16, 17 and 18. If desired, the latent heat of condensation in one or more of the condensers 56', 56'', 56''', hereinafter described, may be utilized by by-passing oil therethrough by means of valve controlled branch pipes 13', and the preheated oil discharged from the heat exchangers may, if desired, be further preheated by a preheater 19 to which saturated steam is admitted under control of a valve 20.

The preheated oil, in liquid form, is discharged as a solid or comminuted jet from the last conduit section 13, under control of a valve 21, into a mixer 22, preferably of the injector type, and a jet of superheated steam is discharged into the mixer countercurrent to the oil jet from the conduit 23 under control of a valve 23', the two fluids being discharged under substantially the same pressure. The mixing chamber or injector freely discharges, through the tube 24, tangentially into the peripheral chamber 25 of a separator 26, whereby the steam-oil mixture is immediately expanded and its pressure reduced (preferably below twenty pounds and as near atmospheric pressure as is compatible with economic operation) with resulting substantially instantaneous vaporization of the volatile hydrocarbon constituents without cracking; the temperature of the preheating surfaces being maintained below the initial temperature of the steam-oil vapor mixture. The tangential discharge and the expansion of the mixture gives it a whirling action and results in deposition of unvaporized particles, with adhering sulphur, on the conical bottom 26' of the separator 26, from which such products may be removed by way of a suitable trap.

The steam-oil vapor mixture escapes from the peripheral chamber 25 of the separator through the axial flue 27 into a chamber 27' from which it escapes through vent pipes 28' extending upward from the diaphragm 28 into a friction bell or eliminator 29 comprising a drum having an open bottom and closed top from which depend a plurality of nested side walls 29' which are partially submerged in a liquid seal contained in the bottom of the chamber 30. Each wall of the drum contains small perforations 31 staggered relatively to the perforations in the adjacent walls so that the vapors passing through the eliminator have their direction of flow repeatedly and sharply changed and the exposed areas of the perforated walls are automatically variable (proportionately to changes in the velocity and in the slight pressure of the vapor mixture) by means of the counterweight 32 connected with the drum by means of a tension member 32' passing through a liquid seal 32''.

Unvaporized particles or mist entrained with the steam-oil vapor are detrained by the eliminator and discharged from the bottom thereof through the trapped pipe 33 into the peripheral chamber 25 of the separator 26.

The steam-oil vapor mixture, substantially freed from mist or unvaporized liquid particles, is discharged through the conduit 34 into the first of a series of similar fractionating columns 35, 35$^a$, 35$^b$, 35$^c$, 35$^d$, 35$^e$ having means for mechanically atomizing therein condensate to form a mist or fog of highly dispersed liquid particles in the path of the vapor and for recollecting the dispersed liquid. Such atomization and recollection may be effected by apparatus of known type, but I have found an adaptation of the Feld scrubber most advantageous and have shown it herein for the sake of illustration.

The steam-oil vapor mixture entering the fractionating column 35 flows through the passages 36 between the pans 37 and baffles or drip boards 38 while there are projected across these passages sprays or atomized particles of liquid condensate. Such condensate is picked up from the pans and projected at high velocity across the passages by the cones 39 of usual Feld type which are rapidly rotated by the power driven shaft 40.

Conical baffle plates 41 and 42 are fixed in the upper part of the column 35 to detrain from the vapor mixture atomized condensate or mist carried thereby, and further detrainment of such mist or liquid particles from the vapor is effected by the eliminator 43 to which the vapor mixture passes through the conduit 44 from the top of the column 35; liquid accumulating in the eliminator 43 being returned to the top of the column 35 through the trapped passage 45. The eliminator 43 is similar in all substantial respects to the eliminator 29, and to the series of eliminators 43$^a$, 43$^b$, 43$^c$, 43$^d$ and 43$^e$ connected with the respective fractionating columns by conduits 44$^a$, 44$^b$, 44$^c$, 44$^d$ and 44$^e$ and passages 45$^a$, 45$^b$, 45$^c$, 45$^d$ and 45$^e$.

The passage of the steam-oil vapor mixture through the column 35 and through the atomized condensate or mist therein effects precipitation from the vapor mixture of high dew point condensate, which is collected in the pans 37. Such precipitation is facilitated and the fractionation rectified by the return to the column 35 of cooler hydrocarbon condensate from the similar column 35$^a$. Such rectifying condensate is pumped from the receiver 46$^a$ (supplied from the column 35$^a$) by the pump 47 through the pipe 48 into a regulator 49, from which condensate passes through the pipe 50 into the top of the column 35 under control of the valve 51. Any excess of oil pumped to the regulator 49 is returned to the receiver 46$^a$ through the pipe 52.

The rectifying condensate supplied to the top of the column 35 is atomized or sprayed by the cone mechanisms described. Any constituents of the rectifying condensate within the dew point of the condensate in the column 35 but which may have been carried therefrom by entrainment are collected by the pans 37 and retained in the column 35 after having served to cool the vapor mixture passing through the column. Constituents of the returned rectifying condensate which have lower dew points than the temperature of the vapor mixture in the column 35 are vaporized by such mixture and cause precipitation therefrom of higher dew point condensates by reason of the heat or energy consumed in effecting such vaporization.

Continued precipitation of hydrocarbons of high dew point causes accumulations of condensates in the pans 37 which overflow into the bottom of the column, from which they are withdrawn through the adjustable liquid sealed trap 53 into the receiver 46. This condensate, which in the operation illustrated and described is an uncracked heavy lubricating base, may be carried by the pipe 54 to the heat exchanger 18 to preheat oil flowing to the mixer, and thence, either directly or through a cooler 55, to any desired point.

The vapor mixture discharged from the eliminator 43 passes through a conduit 56 to the next fractionating column 35$^a$, where there is precipitated from the vapor condensate of the next lower dew point desired. Such precipitation is facilitated and the fractionation rectified by the return to the column 35$^a$ of condensate of lower dew point from the column 35$^b$.

The columns 35, 35$^a$, 35$^b$, 35$^c$, 35$^d$, 35$^e$ and their connected parts are all similar in construction and operation to the column 35 and its connected parts and discharge fractions of various dew points and characteristics through adjustable liquid sealed traps, receivers, heat exchangers and coolers to desired points. In the plant illustrated, the condensate discharged from the column 35 will be heavy lubricating base oil; that discharged from the column 35$^a$ will be heavy oil and paraffine; that discharged from column 35$^b$ will be gas oil; that discharged from the column 35$^c$ will be heavy kerosene; that discharged from the column 35$^d$ will be light kerosene and that discharged from the column 35$^e$ will be water-white gasolene.

When the precipitation of hydrocarbon constituents from the steam-oil vapor mixture has been carried to such extent as to leave in the mixture an excess of water vapor, or when water vapor begins to precipitate in substantial quantities in the fractionating columns, there is inserted in the vapor mixture conduits between appropriate columns the water-vapor condensers 56′, 56″ and 56‴ through which oil flowing to the mixer or other cooling fluid may be circulated in contact with vapor carrying tubes. Owing to the differences in dew point and in the surface tensions imposed by the treatment described upon the hydrocarbon constituents and the water-vapor constituents of the mixture, precipitation is effected in these condensers of substantial amounts of water vapor with negligible precipitation of hydrocarbon vapors. The precipitate is discharged from the condensers to decanters 57, 57′, 57″ from which the water flows to waste through the trapped outlets 58, 58′, 58″, while any hydrocarbons which may have been precipitated rise to the tops of the decanters and are returned through the pipes 59, 59′, 59″ to the columns whence the vapor came.

When water vapor begins to precipitate in the fractionating columns, decanters 60$^b$, 60$^c$, 60$^d$, 60$^e$ may be interposed between the traps and receivers, such decanters discharging the condensed water through trapped outlets 61$^b$, 61$^c$, 61$^d$, 61$^e$ and the condensed hydrocarbons flowing from the tops of the decanters to the adjacent receivers, so that no water is recirculated with the recirculated rectifying condensate.

Since there are no hydrocarbon condensates of lower dew point wherewith to cool and rectify the vapor mixture flowing through the column 35$^e$, it may be desirable to supply water to the regulator 49$^e$ of this column to efficiently cool the vapor mixture in the column. Uncondensed hydrocarbons, if any, flowing from this column through the conduit 56$^e$ may be absorbed in a suitable absorbent, collected as gases or wasted to the atmosphere.

If desired, suitable reagents may be introduced into the fractionating columns, as, for instance, through valved connections with the tubes 50, 50$^a$, 50$^b$, 50$^c$, 50$^d$, 50$^e$ to wash out sulphur compounds or for any desired purpose. By appropriate introduction into the columns of suitable reagents, sulphuric acid, or sodium hypochlorite, the hydrocarbons condensing from the distillates may be refined and the redissolving of sulphur compounds prevented.

In the drawing, for simplicity and clarity of illustration, the outlet traps are shown outside of and below the fractionating columns, but in some cases it is advisable to place such traps within the columns to conserve heat. Furthermore, while the receivers 46—46ᵃ are shown above and before the heat exchangers 13—14, the positions of these parts may be reversed so that the rectifying condensate returned to the next preceding column will be further cooled.

For "topping" operations, the plant illustrated may be provided with a supplementary mixer 22' and separator 26' discharging through an eliminator 28' into the fractionating column 35ᶜ. Such supplementary mixer, separator and eliminator may be used with a comparatively small amount of steam at comparatively low temperature and in conjunction with the fractionating columns 35ᶜ, 35ᵈ and 35ᵉ to separate the constituents commonly combined as "once run distillate". The heavier constituents of the crude will, in such operations, be unvaporized and may be discharged as fuel oil or for further treatment through the trapped bottom 27' of the supplementary separator.

In the operation of a plant such as shown in the drawings, for complete fractionation of the oil, it has been found desirable to preheat the oil as much as possible without raising the temperature of the preheating surfaces above the temperature of the ensuing steam-oil vapor mixture and without cracking or dehydrogenating the oil. In treating Persian crude oil, steam may be introduced into the mixer 22 at a temperature of from 750 to 1000 degrees F. at a pressure of say 150 pounds and oil at a temperature of say 200 to 300 degrees F. and under a pressure imposed by the pump 12 of say 150 pounds. Under such conditions, satisfactory fractionation and satisfactory desulphurization without the use of catalysts, are obtained, without cracking, by the introduction of .9 part by weight of steam per part by weight of oil, though an increase in the temperature and volume of steam was found to improve desulphurization without cracking. It will, however, be understood that the quantity, pressure and temperature of the superheated steam and the pressure and temperature of the oil introduced into the mixer will be regulated in accordance with the character of the oil under treatment and the product desired.

A primary advantage of my process is the avoidance of any necessity for "cracking", and the recovery in fractionated form of substantially the theoretical content of the crude of the desired fractions, the fractionation being effected with but a single vaporization effected by the use of superheated steam, to achieve maximum desulphurization. The use of my process greatly diminishes the size and cost of the plant required and permits the continuous operation of the plant, since there are no still bottoms to burn out or require cleaning; reduces the wear, tear and danger commonly incident to the operations of a refinery since there is no fire near the oil and exposure to gas poisoning is eliminated; and also greatly reduces the usual distilling and refining losses, while permitting great flexibility in the operation of the plant and the products secured.

Having described my invention, I claim:

1. The method of treating petroleum which comprises the vaporization thereof by direct admixture of superheated steam therewith and immediate expansion of the mixture, and simultaneously precipitating from the resultant mixture of vapor and steam hydrocarbon constituents and enriching the hydrocarbon content of the mixture by contact with mechanically atomized hydrocarbon condensate.

2. The method of treating petroleum which comprises the formation of an oil-steam vapor, and precipitating hydrocarbons from said vapor in stages, precipitation in one stage being effected in intimate contact with mechanically atomized condensate of another stage.

3. The method of desulphurizing mineral oils which comprises vaporization thereof by direct admixture of superheated steam therewith and immediate expansion of the oil-steam mixture, and precipitation of hydrocarbon constituents thereof in intimate contact with mechanically atomized condensate therefrom.

4. The method of treating petroleum which comprises the formation of an oil-steam vapor, precipitating hydrocarbon constituents while the vapor is in intimate contact with mechanically atomized condensate deposited under conditions to which the vapor is then being subjected and in intimate contact with mechanically atomized condensate deposited in a later stage under lower temperature conditions than those to which the vapor is then being subjected.

5. The method of treating steam-mineral-oil vapors which consists in varying the relative surface tension of its constituents by intimate contact with mechanically atomized hydrocarbon condensate and condensing from the mixture water vapor without substantial condensation therewith of hydrocarbon constituents.

6. In the art of refining petroleum, the process which consists in vaporizing a hydrocarbon constituent by direct admixture of superheated steam therewith, and condensing hydrocarbon constituents by intimate contact with a mechanically atomized hydrocarbon mist.

7. The method of treating petroleum which comprises vaporizing volatile constituents thereof without cracking and fractionally condensing the vapors while in intimate contact with mechanically atomized condensate from the vapors.

8. The method of fractionally separating and desulphurizing petroleum, which comprises vaporizing the liquid petroleum without cracking by direct admixture with superheated steam and without exposure to heating surfaces of higher temperature than the initial temperature of the mixture, detraining unvaporized particles from the mixture, condensing the mixture in stages in intimate contact with a mist of mechanically atomized petroleum condensate, detraining from the mixture between condensing stages mist entrained therewith, and mechanically atomizing condensate precipitated in one stage in the path of mixture in another stage.

In witness whereof, I have hereunto set my name this 17th day of March, 1924.

MARK BENSON.